United States Patent

Hori et al.

[11] Patent Number: 5,824,751
[45] Date of Patent: Oct. 20, 1998

[54] BIODEGRADABLE HIGH MOLECULAR COMPOSITION

[75] Inventors: Yoji Hori; Yoko Takahashi; Hideyuki Hongo; Akio Yamaguchi; Toshimitsu Hagiwara, all of Kanagawa, Japan

[73] Assignee: Takasago Koryo Kogyo Kabushiki Kaisha (Takasago International Corporation), Tokyo, Japan

[21] Appl. No.: 592,518

[22] Filed: Jan. 26, 1996

[30] Foreign Application Priority Data

Jan. 26, 1995 [JP] Japan .................................. 7-028900
Nov. 1, 1995 [JP] Japan .................................. 7-306421

[51] Int. Cl.$^6$ .................................................. C08G 63/08
[52] U.S. Cl. ........................ 525/450; 525/93; 525/415; 523/124; 524/539; 528/361
[58] Field of Search ............... 524/539; 525/93, 525/450, 415; 528/361; 523/124

[56] References Cited

U.S. PATENT DOCUMENTS

| | | | |
|---|---|---|---|
| 5,124,371 | 6/1992 | Tokiwa et al. | 523/124 |
| 5,430,125 | 7/1995 | Hori et al. | 528/354 |
| 5,439,985 | 8/1995 | Gross et al. | 525/411 |
| 5,440,007 | 8/1995 | Gross et al. | 528/354 |
| 5,550,173 | 8/1996 | Hammono et al. | 523/124 |

FOREIGN PATENT DOCUMENTS 0 601 885 A2  6/1994  European Pat. Off. ........ C08G 63/08

OTHER PUBLICATIONS

*Hackh's Chemical Dictionary*, Fourth Edition, Grant Ed., McGraw–Hill, NY, NY, 1969, pp. 95, 335.

*Primary Examiner*—Andrew E. C. Merriam
*Attorney, Agent, or Firm*—Sughrue, Mion, Zinn, Macpeak & Seas, PLLC

[57] ABSTRACT

The biodegradable composition comprises at least poly(beta-hydroxybutyric acid) or a biodegradable copolymer thereof and a stereospecifically regular block copolymer having the structure units of formula (I):

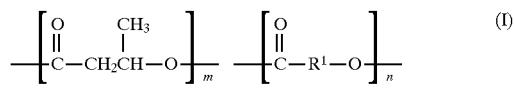

where R1 is a hydrocarbon group having 1 to 14 carbon atoms, optionally including double bonds, oxygen atoms or both of them; and m and n are respectively an integer ranging from 300 to 5,000, or having the structure units of formula (II):

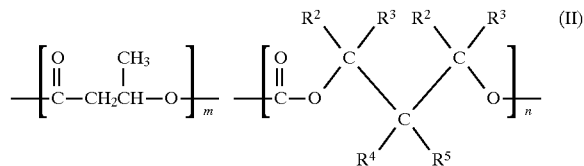

where $R^2$, $R^3$, $R^4$ and $R^5$ are either a hydrogen atom or a methyl group; and m and n are respectively an integer ranging from 300 to 5,000.

19 Claims, 8 Drawing Sheets

BIODEGRADABLE HIGH MOLECULAR COMPOSITION

BACKGROUND OF THE INVENTION

1. Field of the Invention

The present invention relates to a biodegradable high molecular composition comprising a microbially or chemically prepared poly(3-hydroxybutyric acid), hereinafter referred to as P(3HB), or a copolymer thereof and in particular poly(R)-3-hydroxybutyric acid), hereinafter P((R)-3HB), or a copolymer thereof such as poly((R)-3-hydroxybutyric acid-(R)-3-hydroxyvaleric acid) copolymer, hereinafter P((R)-3HB-co-(R)-3HV).

For practical use, this kind of biodegradable composition has to possess appropriate mechanical properties.

The invention relates therefore also to the use of an agent suitable for plasticizing and compatibilizing constituents of the biodegradable high molecular composition, in order to render the latter more suitable for practical use.

Recently, used and little decomposable films or fishing lines have come to pose a serious environmental problem, so that the preparation of plastic materials easily decomposable by microorganisms living in Nature is actually an object of intensive research. Such materials are preferably not only biocompatible, but also decomposable and absorbable in a living body. More preferably, they maintain the mechanical strength only whilst tissues are being regenerated, said strength disappearing rapidly after the regeneration.

2. Prior art

In this respect, aliphatic polyesters are known as biodegradable and biocompatible. The polymer P((R)-3HB), in particular, is of special interest, because it is accumulated in microbial cells and is a thermoplastic resin having a high melting temperature of around 180° C. The polymer P[(R)-3HB] is a solid and strong material but at the same time rather brittle with an elongation at break of only 5%. This drawback has prevented it from being reduced to practice (Y. DOI, "Seibunkaisei Kôbunshi Zairyô", Kôgyô Chôsakai, 1990, p19–26).

To improve the above properties, random copolymers have been microbially synthesized: copolymers P((R)-3HB-co-(R)-3HV) and poly((R)-3-hydroxybutyric acid and 4-hydroxybutyric acid), i.e. P[(R)-3HB-co-4HB] were reported respectively by P. A. HOLMES, in Phys. Technol., 1985 (16), p32 and by Y. DOI, in Polym. Commun., 1988 (29), p174.

More recently, various high molecular and biodegradable random copolymers of polyesters, containing the (R)-3-hydroxybutyric acid unit, have been chemically synthesized. This synthesis has been carried out in the presence of a distannoxane catalyst through ring-opening copolymerization between (R)-β-butyrolactones ((R)-β-BL) and various other lactones, as reported in Macromolecules, 1993 (26); p4388.

The random copolymerization lowers the degree of crystallinity and reduces the brittleness of the polymer P((R)-3HB). However, in general, it also causes a decrease in the melting temperature of the polymer.

Another way to palliate the shortcomings of the polymer P((R)-3HB) is to mix a plasticizing monomer or polymer therewith, thereby impeding the crystallization of the polymer.

The mixture with low-molecular monomer plasticizers (acylglycerols) was reported by Y. DOI et al in Kôbunshi, 1991, 47, p221–226.

However, these kind of monomers have a drawback to be eluted out during use, thereby deteriorating the performance of the product.

A high molecular plasticizer may then be adopted as a non-washout type alternative. Actually, a mixture of the polymer P((R)-3HB) with polyethylene or polystyrene, with chloride-containing polymer and with polymethacrylate was respectively reported in Polym. Prepr. of Am. Chem. Soc., Div. Polym. Chem, 1990, 31 (1), p441, in European Patent N° 52 460, 1985, and in Polymer, 1993 (34), p4935.

However, these mixtures constitute a non-compatible system, so that the plasticizers may not be expected to palliate the bitterness of the polymer P((R)-3HB). Moreover, the polymers used as plasticizers are not biodegradable and not appropriate for use as a plasticizer of biodegradable polymers.

On the other hand, a mixture of the polymer P((R)-3HB) with poly(vinyl acetic acid) was reported as being a compatible system in Polym. Degrad. Stab. 1992(36), p241 and Polymer, 1989(30), p1475. However, since the poly(vinyl acetic acid) is not biodegradable, it is not an appropriate plasticizer for biodegradable polymers.

As examples of biodegradable polymer mixtures, a mixture of the polymer P((R)-3HB) with a polysaccharide, with a polycaprolactone (PCL) and with poly (1,4-butyleneadipate) was respectively reported in Biomaterials, 1989 (10), p 400, in Polymer 1994 (35), p2233; Polym. Degrad. Stab., 1992 (36), p241 and in Polym. Degrad. Stab. 1992 (36), p241.

In this case, the mixtures do not constitute a compatible system, so that the film made of these mixtures has a deteriorated tensile strength and mediocre elongation at break, as reported in Polym. Degrad. Stab. 1992 (36), p241.

As examples of biodegradable and compatible polymer mixtures, a mixture of the polymer P((R)-3HB) with cellulose ester, with polyethyleneoxide, and with atactic poly(3-hydroxybutyric acid), i.e. P(3HB), obtained by ring-opening polymerization of racemic β-butyrolactones (hereinafter BL) was respectively reported in Polym. Bull., 1992 (29), p407; Macromolecules, 1992 (25), p6441; 1993 (26), p6722; in Polymer, 1988 (29), p1731 and in Makromol. Chem., Rapid Commun. 1992 (13), p179.

Amongst them, the mixture of the polymers P((R)-3HB) and P(3HB) was tested for tensile strength, elongation at break and biodegradability and the results were reported in Makromol. Chem., Rapid Commun., 1992 (13), p179. According to this report, the film made of this mixture has a better elongation rate, brittleness performance and biodegradability but its tensile strength decreases gradually as the proportion of P(3HB) increases with respect to P((R)-3HB).

Further, a mixture of the polymer ((R)-3HB) with a block copolymer of polyether and polyester was reported in Kokai Hei 5-132 549. Here also, the mixture has a better brittleness performance and biodegradability compared to the polymer P((R)-3HB), but its tensile strength decreases as the proportion of the block copolymer increases vis-à-vis the polymer P((R)-3HB).

,In order to improve brittleness performance of the polymer P((R)-3HB) or its biodegradable copolymer, it is possible, apart from using a plasticizer, to mix said polymer with a polymer such as polyester or polycarbonate, in principle non-compatible therewith, e.g. PCL by using an appropriate compatibilizer. Such a compatibilizer, a block copolymer of a stereospecifically irregular atactic P(3HB) and the PCL, hereinafter ata-P(3HB)-b-PCL, was reported in Kokai Hei 5-320 323.

However, ata-P(3HB) portion in the structure ata-P(3HB)-b-PCL is amorphous, so that said portion is compatible with the amorphous portion of the polymer P[(R)-3HB] but not compatible with the crystalline portion thereof. This structure entails lowering of tensile strength of the mixture P[(R)-3HB] and PCL, as shown in comparative examples 5–8.

In the mixtures of types P((R)-3HB) with PCL, P((R)-3HB) with other polylactone and P((R)-3HB) with polycarbonate, a block copolymer of optically active isotactic P((R)-3HB) with the PCL, ie. iso-P[(R)-3HB]-b-PCL, the same with polylactone and the same with polycarbonate are respectively considered to be the most appropriate as compatibilizer in each type. However, no such copolymers, including the iso-P[(R)-3HB]-b-PCL, possessing enough molecular weight as a compatibilser, have been synthesized up to now.

SUMMARY OF THE INVENTION

It is an object of the present invention to provide a biodegradable high molecular composition comprising microbially or chemically synthesized polymer P(3HB), in particular P((R)-3HB) or a biodegradable copolymer thereof such as P((R)-3HB-co-(R)-3HV), P((R)-3HB-co-4B) etc.

The composition thus prepared has to possess a better impact resistance and reduced brittleness, whilst maintaining good tensile strength, compared to the known compositions of the same type.

It is therefore another object of the invention to provide an agent suitable for plasticizing and/or compatibilizing the above-mentioned polymers and to be added in the composition. Such an agent must itself be biodegradable and biocompatible and also resistant from being eluted out from the composition during use.

To solve the above-mentioned problem, there is provided a biodegradable composition at least comprising either P(3HB) or a biodegradable copolymer thereof and a block copolymer containing a polyester unit, wherein the block copolymer is a block copolymer of P(3HB) with other polyesters or polycarbonates and wherein the P(3HB) unit in the block copolymer has a stereospecifically regular structure.

The block copolymer with other polyesters may have the structure units of formula (I):

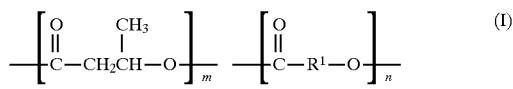

where $R^1$ is a hydrocarbon group having 1 to 14 carbon atoms, optionally including double bonds, oxygen atoms or both of them; and m and n are respectively an integer ranging from 300 to 5,000. In a preferred case, the block copolymer with polyesters is P(3HB)-b-PCL.

The block copolymer with polycarbonates may have the structure units of formula (II):

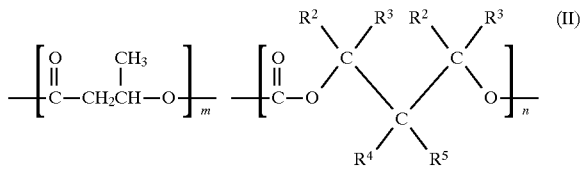

where $R^2$, $R^3$, $R^4$ and $R^5$ are either a hydrogen atom or a methyl group; and m and n are respectively an integer ranging from 300 to 5,000.

In a preferred case the block copolymer with polycarbonates is P(3HB)-b-poly(trimethylene carbonate).

In a more preferred case, weight proportion of P(3HB) or a biodegradable copolymer thereof is above 50% in the total composition. Then the composition is more easily biodegraded.

In another embodiment, the composition may further comprise a polymer non-compatible with the P(3HB) or with a biodegradable copolymer thereof.

In the above case, another polyester or polycarbonate unit in the block copolymer may preferably be constructed with the same monomer constituents as those in the said non-compatible polymer.

In particular, the non-compatible polymer and the polyester or polycarbonate unit in the block copolymer may be a polymer of ε-caprolactone. Preferably, the weight proportion of the P(3HB) or a biodegradable copolymer thereof in total composition is above 50%. Then, the composition is more easily biodegraded. In all the above-mentioned cases, the biodegradable copolymer of P(3HB) may be P((R)-3HB-co-(R)-3HV).

In the above-mentioned embodiments, weight proportion of the block copolymer in total composition is preferably below 90% but more preferably not above 10%, for example 5% or 10%. When its proportion is below 90% by weight, a certain beneficial effect is already observed. When this proportion is equal to or below 10% by weight, tensile strength and elongation are both considerably improved.

The compositions according to the invention are obtained by a process comprising the steps of:

a) reacting (R)-β-BL, (S)-β-BL or β-BL in the presence of a catalyst under inert conditions, thereby obtaining P(3HB);

b) adding a small amount of inert diluting solvent thereto;

c) reacting another lactone or cyclic carbonate therewith, thereby obtaining a block copolymer of P(3HB)-polyester or -polycarbonate (AB type block copolymer) in appropriate monomeric molar ratio;

d) reacting, where appropriate, further (R)-β-, (S)-β-, β-BL or another lactone or cyclic carbonate therewith, thereby obtaining ABA type or ABC type block copolymer; and e) mixing thus obtained block copolymer with P(3HB) or a biodegradable copolymer thereof in appropriate proportion.

The catalyst to be used in the process may be a distannoxane of the formula (III):

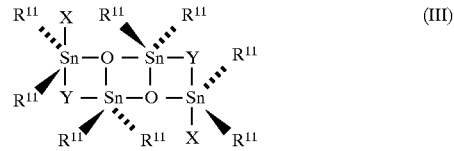

where $R^{11}$ indicates an alkyl group having 1 to 12 carbon atoms, an aralkyl group having 12 carbon atoms at maximum or a phenyl group; X is selected from the group consisting of Cl, Br and NCS; and Y is selected from the group consisting of Cl, Br, NCS, OH, an alkoxy group having 1 to 4 carbon atoms and a phenoxy group.

Therefore, in the composition according to the invention the stereospecifically regular block copolymer of P(3HB) with the polyester having the structure units of formula (I) or with the polycarbonate having the structure units of formula (II) is used as a plasticizer and/or compatibilizer. The polymers P(3HB), P((R)-3HB), P((R)-3HB-co-(R)-

3HV) etc. contained in the present composition may be a polymer composed solely of 3-hydroxybutyric acids, of (R)-3-hydrobutyric acids or of (R)-3-hydroxybutyric acids and (R)-3-hydroxyvaleric acids, but may also comprise a portion of other monomeric constituents not indicated above.

As described above, the block copolymer used as plasticizer and/or compatibilizer in the present composition has a first constituting unit P((R)-3HB), P((S)-3HB), or syndio-P (3HB) and a second constituting unit of polyester or polycarbonate.

The first constituting unit is synthesized from β-BL of the formula (IV):

When optically active (R)-β-BL or (S)-β-BL is to be used, it is prepared for example according to the method disclosed in Kokai Hei 6-128 245 and Kokai Hei 7-188 201 wherein diketene is asymmetrically hydrogenated in the presence of a catalyst ruthenium-optically active phosphine complex. On the other hand, racemic β-butyrolactone is a commercially available product. Lactones forming the polyester of the second constituting unit in the block copolymer have the formula (V):

where $R^6$ is a bivalent group having 2 to 15 carbon atoms, optionally including double bonds and/or oxygen bonds.

Such lactones include, for example, β-butyrolactone, β-propiolactone, β-ethyl-β-propiolactone, α-methyl-β-propiolactone, α,α-dimethyl-β-propiolactone, α,β-dimethyl-β-propiolactone, γ-butyrolactone, α-methyl-γbutyrolactone, β-methyl-γ-butyrolactone, γ-methyl-γ-butyrolactone, δ-valerolactone, β-methyl-δ-valerolactone, ε-caprolactone, 15-pentadecanolide, 16-hexadecanolide.

The lactones may also contain double bonds. This group includes, for example, 5,6-dihydro-2H-pyran-2-one, 3,4-dlhydro-6-methyl-2H-pyran-2-one, 5,6-dihydro-6-methyl-2H-pyran-2-one, 9-hexadecen-16-olide, etc.

Further, the lactones may contain ester or ether groups. This group includes, for example, glycolide, L-lactide, D,L-lactide, 4-dioxepan-5-one, 7-methyl-1,4dioxepan-5-one, 12-oxa-16-hexadecanolide, 11-oxa-16-hexadecanolide, 10-oxa-16-hexadecanolide etc. Optically active (R)-7-methyl-1,4-dioxepan-5-one ((R)-MDO) and (S)-7-methyl-1,4-dioxepan-5-one ((S)-MDO) may be prepared through the method disclosed in Kokai Hei 4-316 575. wherein the products were obtained from optically active methyl-3-hydroxybutylate. α,α-dimethyl-β-propiolactone may be prepared through the method of Y. YAMASHITA, Y. ISHIKAWA and T. TSUDA, disclosed in Kôgyo Kagaku Zasshi, 1964 (67), p252, whilst α,β-dimethyl-β-propiolactone through the method of P. B. DERVAN and C. R. JONES, disclosed in J. Org. Chem., 1979 (44), p2116.

15-pentadecanolide may be prepared through the method disclosed in Org. synth., 1987 (58), p98, and 16-hexadecanolide through the method of H. H. MATHUR and S. C. BHALTACHARYYA, disclosed in J. Chem. Soc., 1963, p3305.

Further, 5,6-dihydro-2H-pyran-2-one may be prepared through the method disclosed in Org. Synth., 1979 (56), p49.

The above-mentioned lactones may be chosen among commercial or synthetic products and used as such. However, purified products, for example twice distilled after calcium hydride addition and preserved till use under inert gas, may preferably be used.

Cyclic carbonates forming the polycarbonate of the second constituting unit in the block copolymer have the formula (V):

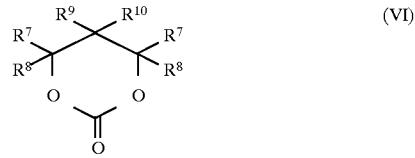

where $R^7$, $R^8$, $R^9$ and $R^{10}$ indicate either a hydrogen atom or a methyl group. The cyclic carbonates include for example, trimethylene carbonate, 2,2-dimethyl trimethylene carbonate, 2-methyl trimethylene carbonate, 3-methyl trimethylene carbonate, 2,3-dimethyl trimethylene carbonate, 2,4-dimethyl trimethylene carbonate, 2,3,4-trimethyl trimethylene carbonate, 2,3,3,4-tetramethyl trimethylene carbonate, etc.

These cyclic carbonates may easily be prepared by adding dropwise triethylamine in a toluene solution of corresponding diol and chloroethylformate cooled in an ice-water bath, according to the method of T. ENDO et al, disclosed in Nippon Kagaku Kai, 61st Shunki Nenkal Kôen Yokôshu II, 1991, p1910, legal person Nippon Kagaku Kai.

The above mentioned polylactone, second constituting unit of the block copolymer may be formed by racemic or optically active lactones, whereas the polycarbonate of the second constituting unit by racemic or optically active cyclic carbonates. Where appropriate, optically different types may be used together.

Proportion of the first constituting unit P((R)-3HB), P((S)-3HB) or syndio-P(3HB) to the second constituting unit polyester or polycarbonate in the block copolymer, expressed in monomeric molar ratio min, is preferably between 10:90 and 90:10. more preferably between 20:80 and 80:20, and most preferably between 30:70 and 70:30.

Number average molecular weight (Mn) of the block copolymer is preferably between 30,000 and 1,000,000, more preferably between 70,000 and 800,000 and most preferably between 100,000 and 600,000.

In the block copolymerization according to the invention, (R)-β-BL, (S)-β-BL or β-BL is placed in a reactor with an inert solvent or without solvent under inert gas such as nitrogen or argon, and then a catalyst as described hereafter is added thereto. A first step to polymerization is effected at a temperature ranging from 60° to 180° C. under atmospheric pressure for 30 minutes to 5 hours. To the resultant solution is added a small amount of inert solvent, thereby lowering the viscosity of the solution. Thereafter, a second step of reaction is effected by adding lactones other than (R)-β-BL, (S)-β-BL or β-BL or cyclic carbonates dissolved in a small amount of inert solvent, to the solution and by further reacting the mixture for 1 to 48 hours. An AB-type block copolymer can thus be obtained.

On the contrary, the first step of polymerization may be effected by reacting lactones or cyclic carbonates, then the second step is effected by adding thereto (R)-β-BL, (S)-β-BL or β-BL, thereby obtaining BA-type block copolymer. Reverting to the AB-type block copolymerization, when (R)-β-BL, (S)-β-BL or β-BL is added after the second step of polymerization, ABA type block copolymer is obtained. When instead other lactones or carbonates are added, ABC type is obtained.

The catalyst to be used for such polymerization is preferably a tin-containing catalyst such as dibutyltin oxide, dioctyltin oxide, tin dioctoate, dibutyltin dilaurate, etc.

The more preferable tin-containing catalyst is a distannoxane of the formula (III). The distannoxane catalysts having formula (III) comprise for example 1,3-dihalogenotetraalkyl distannoxanes such as 1,3-dichlorotetramethyl distannoxane, 1,3-dichlorotetrabutyl distannoxane, 1,3-dichlorotetraphenyl distannoxane, 1,3-dichlorotetraoctyl distannoxane, 1,3-dichlorotetradodecyl distannoxane, 1,3-dibromotetrabutyl distannoxane, etc; 1-hydroxy-3-halogenotetraalkyl distannoxanes such as 1-hydroxy-3-chlorotetramethyl distannoxane, 1-hydroxy-3-chlorotetrabutyl distannoxane, 1-hydroxy-3-chlorotetraoctyl distannoxane, 1-hydroxy-3-chlorotetradodecyl distannoxane, 1 -hydroxy-3-bromotetrabutyl distannoxane, etc.; 1-alkoxy-3-halogenotetraalkyl distannoxanes such as 1-methoxy-3-chlorotetramethyl distannoxane, 1-methoxy-3-chlorotetrabutyl distannoxane, 1-methoxy-3-chlorotetraoctyl distannoxane, 1-ethoxy-3-chlorotetramethyl distannoxane, 1-ethoxy-3-chlorotetrabutyl distannoxane, 1-ethoxy-3-chlorotetraoctyl distannoxane, 1-ethoxy-3-chlorotetradodecyl distannoxane, 1-phenoxy-3-chloroteamethyl distannoxane, 1-phenoxy-3-chlorotetrabutyl distannoxane, 1-methoxy-3-bromotetramethyl distannoxane, 1-methoxy-3-bromotetrabutyl distannoxane, 1-ethoxy-3-bromotetrabutyl distannoxane 1-phenoxy-3-bromotetrabutyl distannoxane etc.; 1-hydroxy-3-(isothiocyanato)tetraalkyl distannoxanes such as 1-hydroxy-3- (isothiocyanato)tetramethyl distannoxane, 1-hydroxy-3-(isothiocyanato)tetrabutyl distannoxane, 1-hydroxy-3-(isothiacyanato)tetraoctyl distannoxane, 1-hydroxy-3-(isothiocyanato)tetradodecyl distannoxane, etc.; 1-alkoxy-3-(isothiocyanato)tetraalkyl distannoxanes such as 1-methoxy-3-(isothiocyanato) tetramethyl,butyl or octyl distannoxane,, 1-ethoxy-3-(isothiocyanato)tetramethyl, butyl, octyl, or dodecyl distannoxane, 1-phenoxy-3-(isothiocyanato)tetramethyl or butyl distannoxane etc.; and 1,3-bis(isothiocyanato) tetraalkyl distannoxanes such as 1,3-bis(isothiocyanato) tetramethyl, butyl, octyl, or dodecyl distannoxane etc.

These catalysts are easily synthesized by reacting dibutyltin oxide and dibutyltin diisothiocyanate in ethanol, as described for example in J. Organomet. Chem., 1965 (3), 70, for the synthesis of 1,3-dichlorotetraphenyl distannoxane and in J.Org. Chem., 1991 (56), 5307 for the synthesis of 1-hydroxy-3-(isothiocyanato)tetrabutyl distannoxane.

The present invention uses at least one such catalyst and, when appropriate, several such catalysts together.

The catalyst is added in a proportion of 1/500 to 1/40,000 moles relative to the starting monomers, and preferably of 1/1,000 to 1/20,000 moles.

Any of the usual solvents for ring-opening polymerization may be used. These include linear or cyclic ethers such as diisopropylether, tetrahydrofuran, 1,4-dioxane or the like, halogenated organic compounds such as methylene bromide, dichloroethane or the like, aromatic compounds such as toluene, benzene, xylene or the like and mixtures thereof.

These solvents may be a refined products of commercial solvents: a solvent may be refined by adding metallic sodium and benzophenone and by distilling under inert gas, then preserved in inert gas until use.

The obtained block copolymer of P(3HB) with polyester or polycarbonate is mixed with P[(R)-3HB] or a biodegradable copolymer thereof, and optionally with a non compatible polymer, thereby forming the biodegradable composition according to the invention. In case of the compositions comprising P[(R)-3HB] and a block copolymer with polyester or polycarbonate, Table 1 shows that all the mixture compositions have a better elongation performance than comparative example 1 that is composed solely of P((R)-3HB), while maintaining the same degree of tensile strength. The results of biodegradability tests for some of these examples show that when weight proportion of the polymer P((R)-3HB) constitutes a major part in the composition, the samples are more easily biodegraded.

In case of the composition further comprising a non-compatible polymer, the compositions of the invention (Examples 1 to 6) have a better elongation rate (reduced brittleness) than the polymer P((R)-3HB) (Comparative example 1), while maintaining the same degree of tensile strength.

When comparing Examples 3 and 4 with Comparative example 3 and Examples 5 and 6 with comparative example 4, the compositions of the invention clearly demonstrate a better mechanical strength (tensile strength and elongation rate) than the samples without the block copolymer do.

When comparing Examples 3 and 4 with comparative example 5, examples 5 and 6 with comparative example 6 and examples 7 and 8 with comparative example 7, the compositions of the invention iso-P((R)-3HB)-b-PCL and syn-P(3HB)-b-PCL clearly show a better mechanical strength than ata-P(3HB)-b-PCL (comparative examples 5–7).

The results of biodegradability test of some of these examples show that when weight proportion of the polymer P((R)-3HB) constitutes a major part in the composition, the samples are more easily biodegraded.

The known plastics, such as P((R)-3HB) and P((R)-3HB-co-(R)-3HV), though biodegradable, are rather brittle and fragile products so that their use is considerably limited.

Compared the those above, the biodegradable composition of the present invention has an improved elongation rate and reduced brittleness, while maintaining the same degree of tensile strength.

Thus, the new composition gives a flexible and stretchable product and palliate the shortcoming of the known plastics. The new composition may be used as a sheet for agricultural use, a packing film, a surface film for a paper cup or similar.

BRIEF DESCRIPTION OF THE DRAWINGS

The above and other objects, features and advantages of the invention will be apparent from the following description of the preferred embodiments, given as non-limiting example, with reference to the accompanying drawings in which.

DETAILED DESCRIPTION OF PREFERRED EMBODIMENTS

Figure 1:
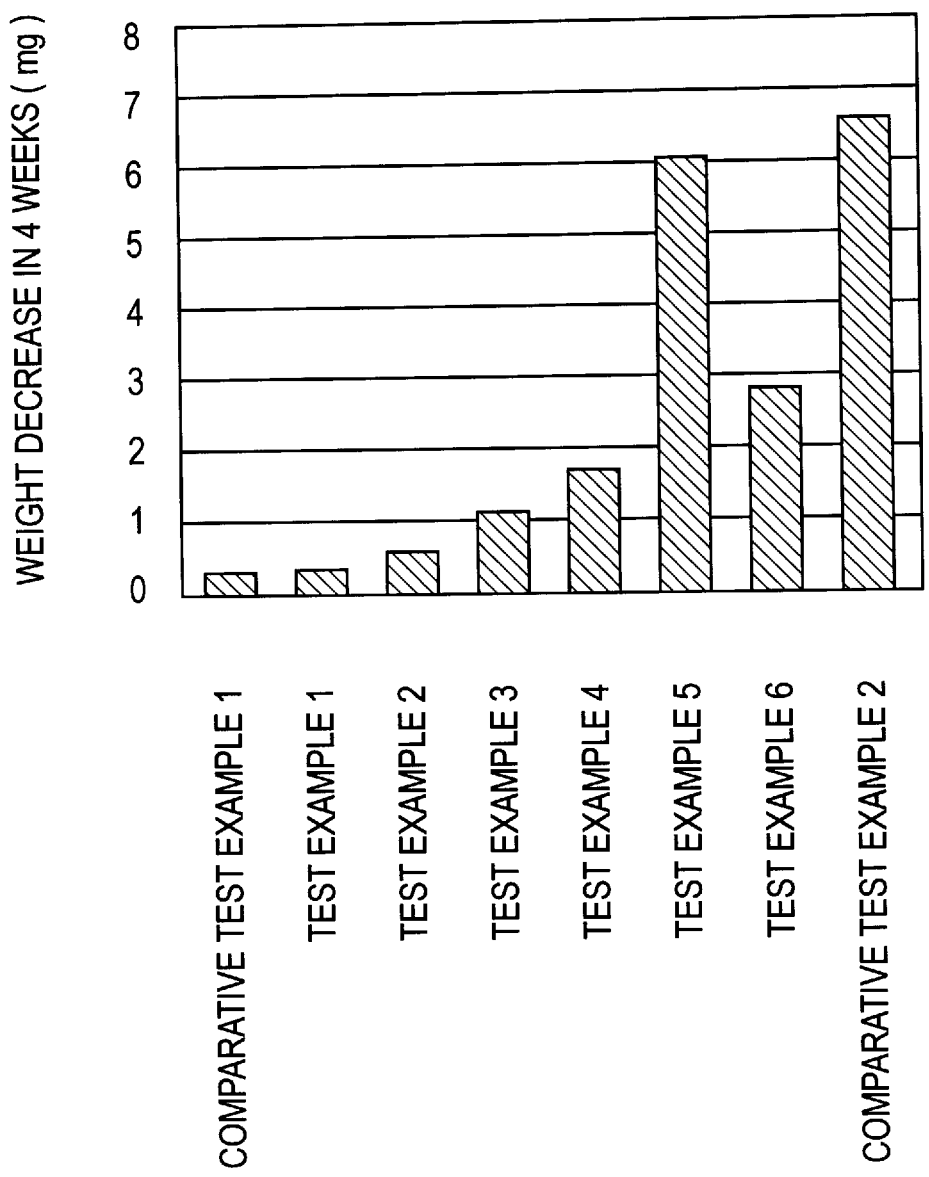
FIG. 1 shows the results of the biodegradation tests carried out on P ((R)-3HB)-block copolymer compositions.

The following analyses were used for the examples and test examples in the present invention and apparatus for the biodegradability tests:

1) Nuclear magnetic resonance spectrum (NMR): AM-400 type (400 MHz) device made by Bruker Corp.
2) Molecular weight: D-2520 GPC integrator made by Hitachi Seisaku Sho.
3) Differential scanning calorimeter (DSC): DSC 50 made by Shimadzu Seisaku Sho.
4) Tensile strength test: Shimadzu Autograph AGS-50B made by Shimadzu Seisaku Sho
5) Biodegradability test: activated sludge, purchased from the "Kagakuhin Kensa Kyokai" foundation on January 20th, 1994.

Each type of measurement was effected by using the above-mentioned devices and according to the method described in the article "Decomposition tests of chemical compounds by using inter alia, micro-organisms" provided in "Kan Po Gyo No. 5". "Yaku Hatsu No. 615" and "49 Ki Kyoku No. 392", Jul. 13, 1974 under the title "Testing methods relating to new chemical compounds" and also according to the article by Y. DOI, A. SEGAWA and M. KUNIOKA, Int.J.Biol.Macromol., 1990, Vol. 12, April 106.

Two series of experiments were effected; the first series (I-a, I-b) relates to a composition composed of P[(R)-3HB] or its copolymer and a stereospecifically regular block copolymer of P[(R)-3HB] with a polyester or polycarbonate and the second series (II-a, II-b) to a composition composed of (A) P[(R)-3HB] or its copolymer, (B) a polymer non-compatible therewith and (C) a stereospecifically regular block copolymer of P[(R)-3HB] or syn-P(3HB) with said non-compatible polymer.

I-a Table 1 summarizes the first series of experiments and collectively indicates for each example a) block copolymers with their monomeric molar ratio before polymerization, b) weight proportion of P[(R)-3HB] to said block copolymer in the composition, c) tensile strength (MPa) of the composition and d) elongation at break (%) of the composition.

In this table 1:

A block copolymer is prepared in a predetermined monomeric proportion indicated for each Example in Table 1, giving rise to a specific number average (Mn) and weight average (Mw) molecular weight:

Example 1 to 5: proportion (R)-3HB to ε-caprolactone (CL)=51:49; Mn=172,000; Mw=272,000

Example 6 to 8: proportion (R)-3HB to CL=19:81; Mn=470,000; Mw=1,183,000

Example 9: proportion (R)-3HB to racemic 3HB=50:50 Mn=115,000; Mw=219,000

Example 10: Proportion (R)-3HB to δ-valerolactone (VL) =51:49; Mn=173,000; Mw=292,000;

Example 11: proportion (R)-3HB to L-lactide(LA)= 54:46; Mn=126,000; Mw=160,000

Example 12: proportion (R)-3HB to (R)-7-methyl-1,4-dioxepan-5-one ((R)-MDO)=49:51; Mn=120,000; Mw=185,000

Example 13: proportion (R)-3HB to 15-pentadecanolide(i 5HPD)=61:39; Mn=140,000; Mw=228,000

Example 14: proportion (R)-3HB to 9-hexadecen-16 olide (16H-9HD after ring-opening)=61:39; Mn=150,006; Mw=224,000

Example 15: proportion (R)-3HB to trimethylene carbonate (TMC)=55:45; Mn=98,000: Mw=169,000

Example 16: proportion (R)-3HB to 2,2-dimethyl trimethylene carbonate (DTC)=55:45; Mn=88,000; Mw=142,000

Example 17: proportion (R)-3HB to CL=19:81; Mn=470, 000; Mw=1,183,000

Example 18. proportion (R)-3HB to TMC.=55:45 Mn=98, 000; Mw=169,000

Comparative example 1: no block copolymer is used.

Comparative example 2: proportion (R)-3HB to CL=51:49; Mn=172,000; Mw=272,000

Comparative example 3: proportion (R)-3HB to CL 19:81; Mn=470,000; Mw=1,183,000, A microbially prepared polymer P[(R)-3HB], P[(R)-3HB-co-11%(R)-3HV] or P[(R)-3HB-co-10% TMC] is mixed with the said block copolymer in a weight proportion indicated for each Example in Table 1, so as to make a total polymer weight of 3 g.

Example 1 to 16: microbial P[(R)-3HB]: Mn=245,000; Mw=546,000.

Example 17: microbial P[(R)-3HB-co-11%(R)-3HV]: Mn=191,000; Mw=425,000.

Example 18: microbial P[(R)-3HB-co-10% TMC]: Mn=110,000; Mw=210,000.

In example 1, 2.7 g of microbial P[(R)-3HB] is mixed with 0.3 g of iso-P[(R)-3HB]-b-PCL to obtain the desired proportion 90:10 in the total mixture of 3.0 g. Equally, In the other examples, the mixtures are prepared so as to obtain the desired proportion in the total of 3.0 g.

The mixture of microbial P[(R)-3HB] and the block copolymer is dissolved in chloroform, cast into a film and dried for one week. The film thus formed is degassed by rolling and pressed for 3 minutes at 150° C. under 300 atmospheric pressure.

The film Is then punched into a shape called a "dumbbell" and the shaped sample is subjected to tensile and elongation testing.

I-b FIG. 1 summarizes the results of the biodegradability test effected on some representative samples. In FIG. 1;

1.0 g of mixture of microbial P[(R)-3HB] and block copolymer is dissolved in chloroform, cast in a disk, formed into a film by distilling the chloroform and dried for one week. The film thus obtained is 1 cm×1 cm square, 0.05 to 0.1 mm thick. 13 to 21 mg of film is put into 50 ml of flask. 30 ml of activated sludge (500 ppm in 600 ml) is added into the flask and reacted at 26° C. at pH 6.0 to 7.0 under stirring in a thermostat water bath made by Tytech Ltd.

Decrease in the film weight is weighed after 4 weeks of biodegradation.

In all test examples: Microbial P[(R)-3HB]: Mn=245,000; Mw=546,000. iso-P[(R)-3HB]-b-PCL proportion (R)3HB to CL=61:49; Mn=172,000; and Mw=272,000

Test example 1: 0.1 g of microbial P[(R)-3HB] was mixed with 0.9 g of iso-P[(R)-3HB]-b-PCL (10:90). The mixture was dissolved in chloroform and proceeded as described above. Weight decrease in the product film was 0.26 mg after 4 weeks of biodegradation.

Test example 2: 0.3 g of microbial P[(R)-3HB] was mixed with 0.7 g of iso-P [(R)-HB]-b-PCL (30:70). Weight decrease in the product film was 0.48 mg after 4 weeks.

Test example 3: 0.5 g of microbial P[(R)-3HB] was mixed with 0.5 g of iso-P [(R)-3HB]-b-PCL (50:50). Weight decrease in the product film was 1.09 mg after 4 weeks.

Test example 4: 0.7 g of microbial P[(R)-3HB] was mixed with 0.3 g of Iso-P [(R)-3HB]-b--PCL (70:30). Weight decrease in the product film was 1.66 mg after 4 weeks.

Test example 5: 0.8 g of microbial P[(R)-3HB] was mixed with 0.2 g of iso-P [(R)-3HB]-b-PCL (80:20). Weight decrease in the product film was 6.04 mg after 4 weeks.

Test example 6: 0.9 g of microbial P[(R)-3HB] was mixed with 0.1 g of iso-P [(R)-3HB]-b-PCL (90:10). Weight decrease in the product film was 2.84 mg after 4 weeks.

Comparative test example 1: 1.0 g of iso-P[(R)-3HB]-b-PCL was used alone. Weight decrease in the product film was 0.20 mg after 4 weeks.

Comparative test example 2: 1.0 g of microbial P[(R)-3HB] was used alone Weight decrease in the product film was 6.65 mg after 4 weeks.

II-a. Table 2 summarizes the second series of experiments and collectively indicates for each example a) constituents of the composition, b) weight proportion of each constituents in the composition, c) tensile strength (Mpa) of the composition and d) elongation at break (%) of the composition.

Synthesis of the block copolymer containing isotactic P[(R)-3HB] portion. 1.72 g (20 mmols) of (R)-BL, 2.0 ml of toluene and 5.6 mg (0.005 mmol) of 1-ethoxy-3-chlorotetrabutyl distannoxane were prepared in 20 ml of reactor and stirred for 5.5 hours at 100° C. under argon atmosphere. To the resultant solution was added 2.0 ml of toluene, immediately followed by other lactones or cyclic carbonates and the entire mixture was reacted for appropriate time. The product was dissolved in chloroform and precipitated by introducing it into a mixture of diethylether and hexane (1:3). The block copolymer thus obtained had the iso-P[(R)-3HB] portion containing at least 96% of Isotacticity. Its melting temperatures are 154° C. and 52° C.

Figure 3:
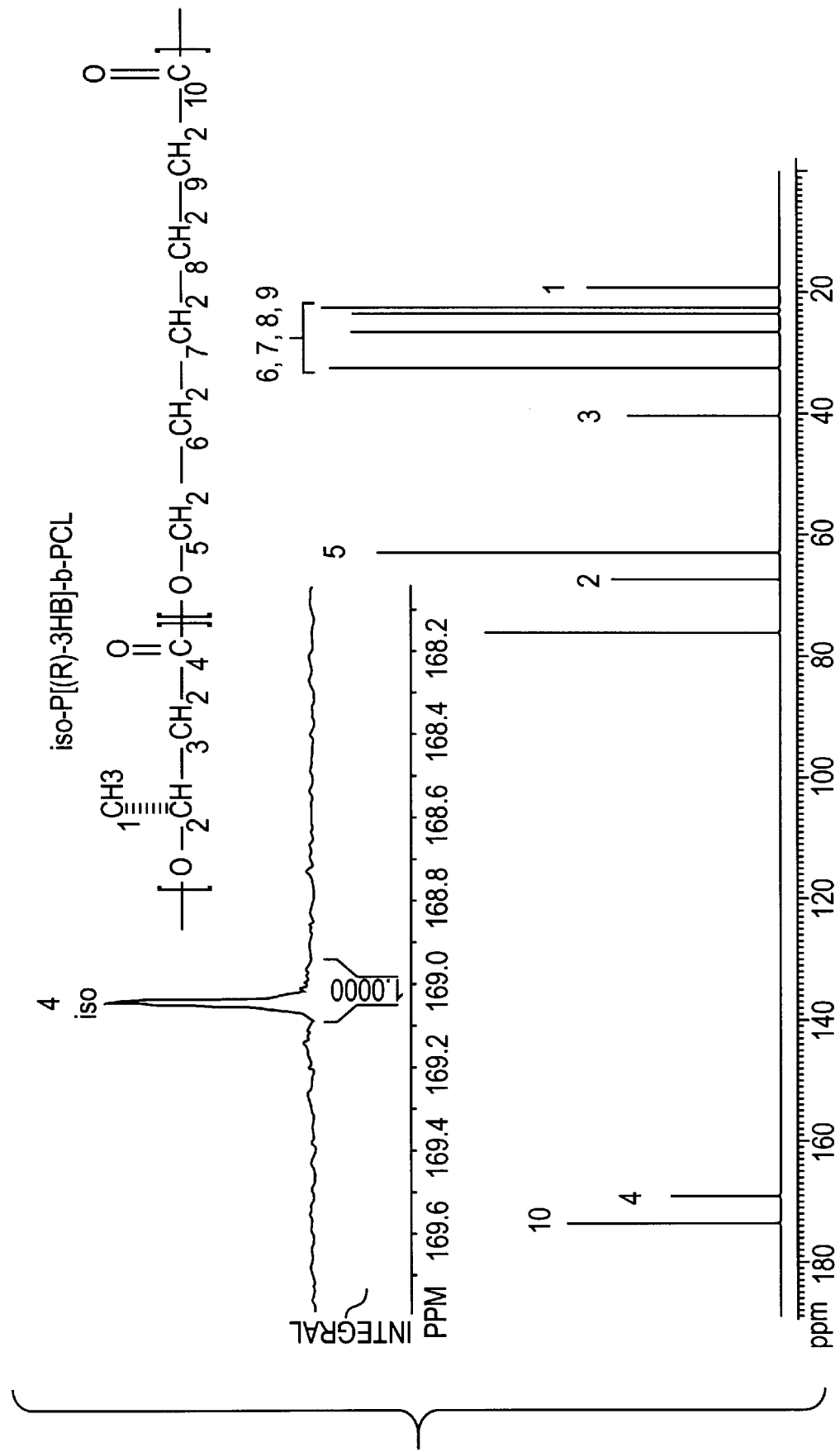
FIG. 3 is a $^{13}$C NMR chart of iso-P((R)-3HB)-b-PCL.
Figure 6:
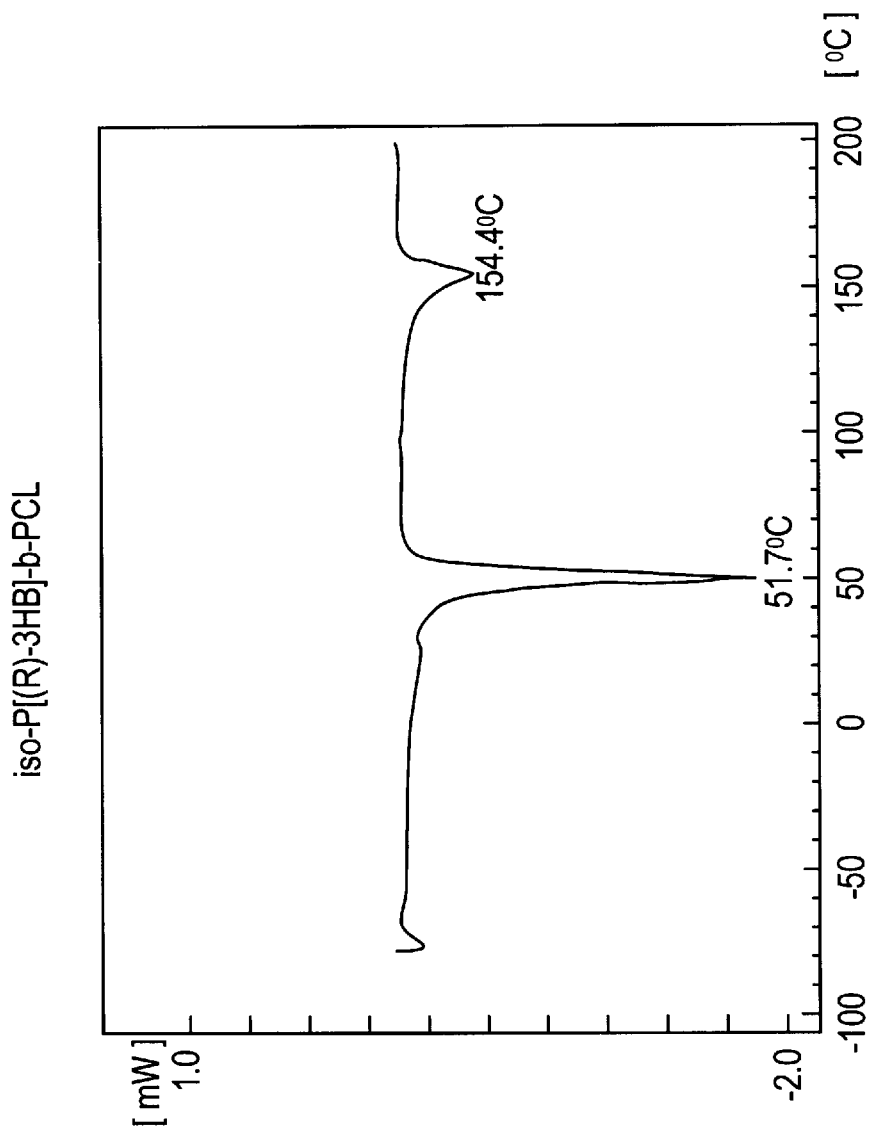
FIG. 6 is a DSC chart of iso-P((R)-3HB)-b-PCL.

Isotacticity is calculated from the integral of iso peak appeared in NMR spectrum according to the known method. FIG. 3 shows a $^{13}$C NMR spectrum in which, when the peak of C4 is enlarged, only the isotactic diad is observed near 169.05. The peak due to the syndiotactic diad near 169.15 is very small and hindered by noise. FIG. 6 shows a DSC chart indicating the melting points at 154° C. and 52° C.

Figure 4:
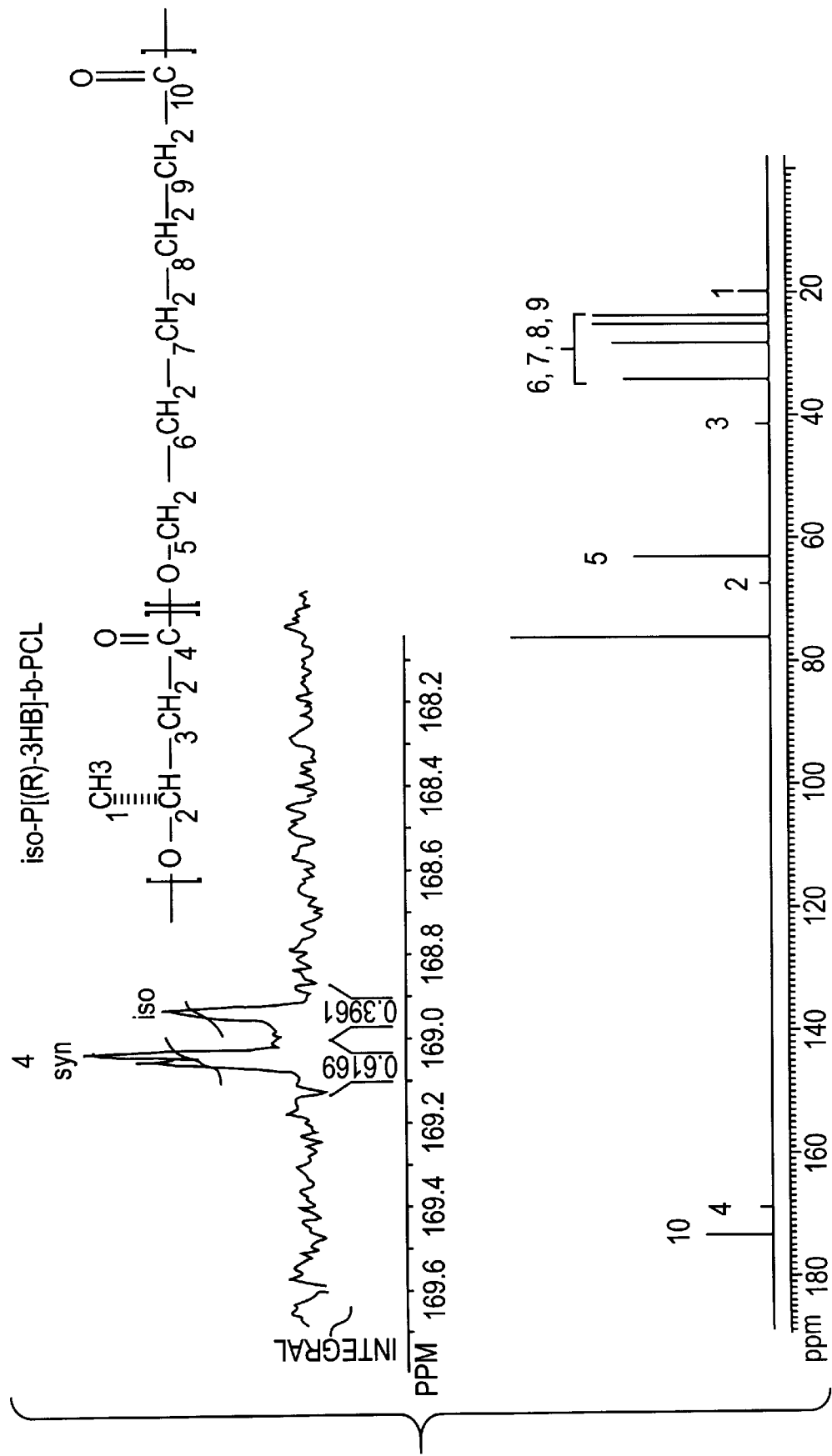
FIG. 4 is a $^{13}$C NMR chart of syn-P((R)-3HB)-b-PCL.
Figure 7:
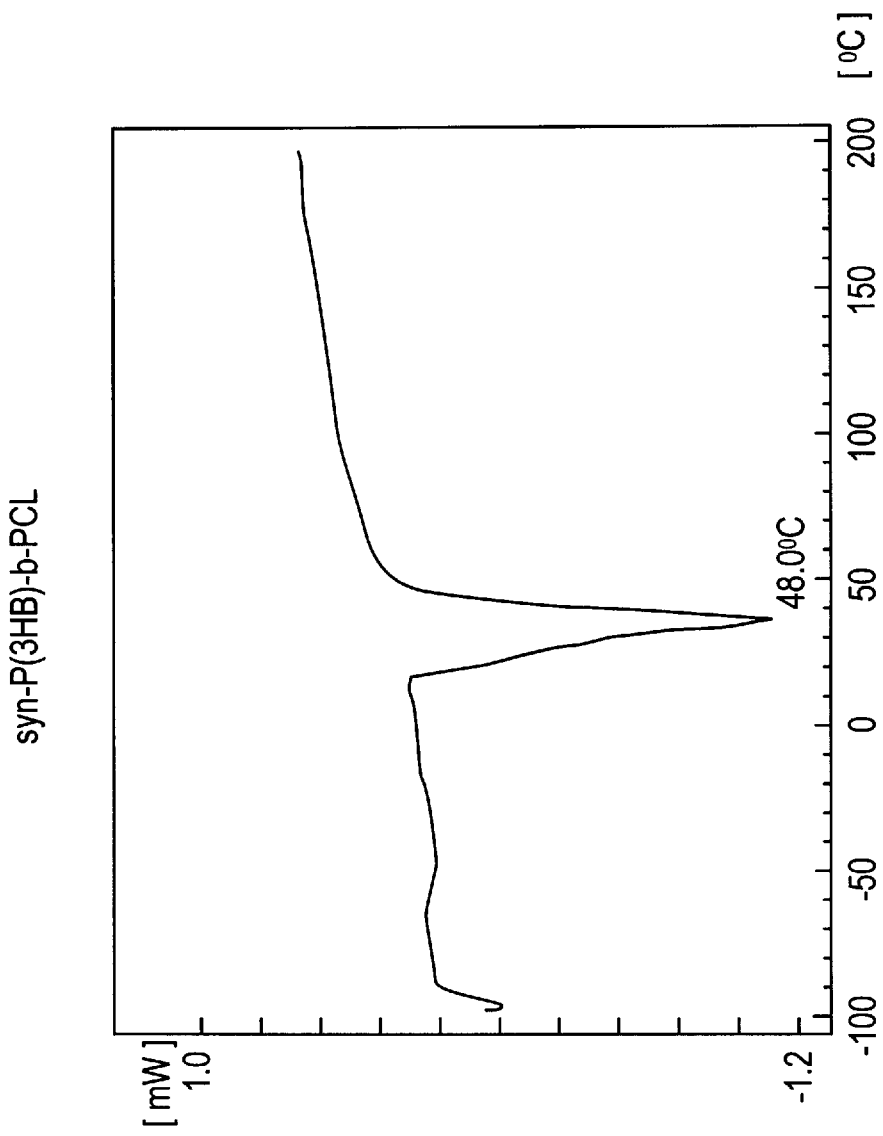
FIG. 7 is a DSC chart of syn-P((R)-3HB)-b-PCL.

Synthesis of the block copolymer containing syndiotactic P(3HB) portion. Racemic BL was used instead of (R)-BL in the above-mentioned reaction conditions The block copolymer thus obtained had the syn-P(3HB) portion containing 61% of syndiotacticity. Its melting temperature is 46° C. Syndiotacticity is calculated from the integral of syndio peak appeared in NMR spectrum. FIG. 4 shows a $^{13}$C NMR spectrum in which, when the peak of C4 is enlarged, an isotactic diade near 169.05 and a syndiotactic diad near 169.15 are observed. From the proportion syndio to iso type, the syn-P(3HB) portion is calculated to have 61% of syndiotacticity. FIG. 7 shows a DSC chart indicating the melting point at 46° C.

Synthesis of atactic block copolymer ata-P(3HB)-b-PCL. The atactic block copolymer was synthesized according to the known method.

Figure 5:
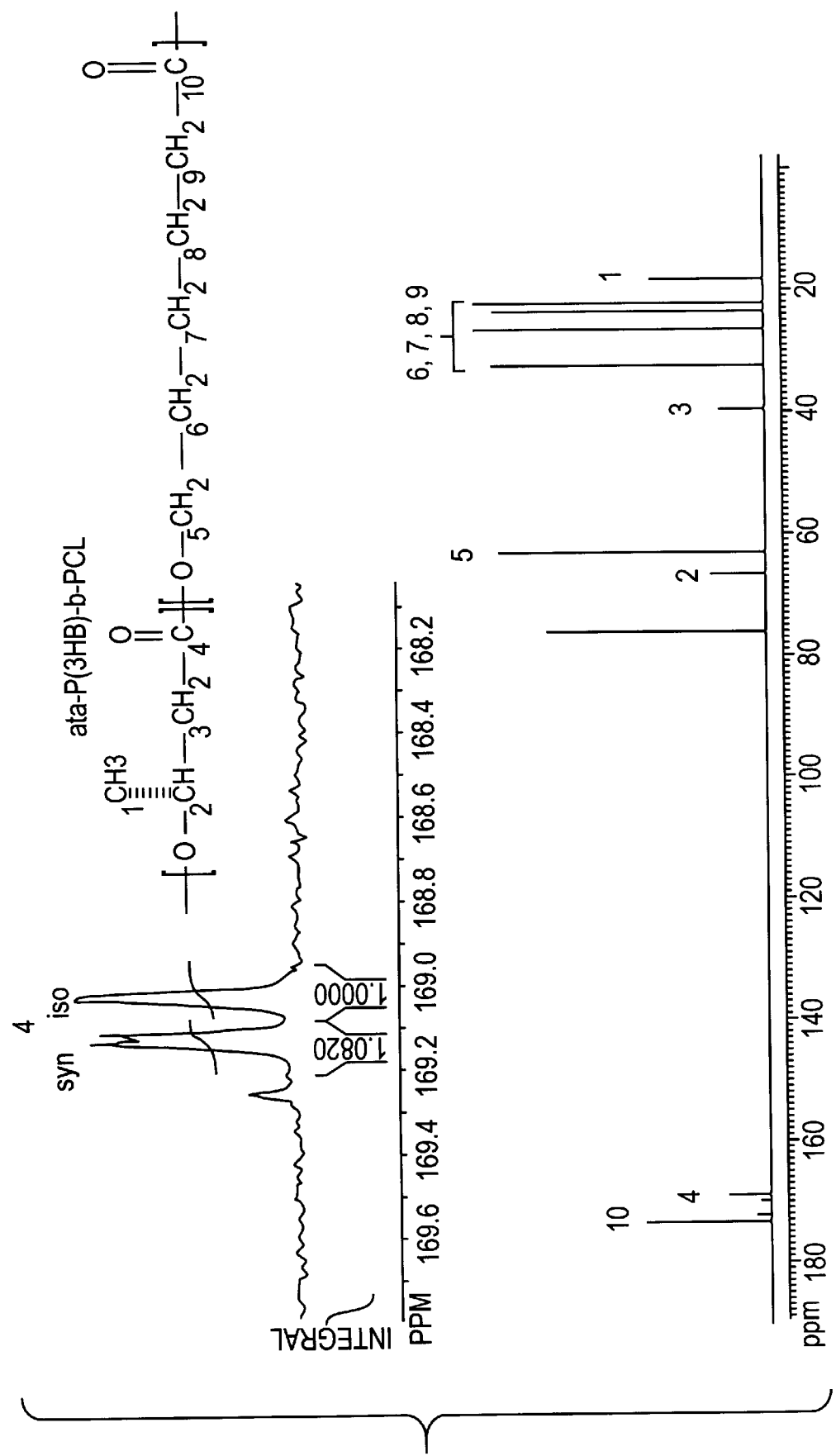
FIG. 5 is a $^{13}$C NMR chart of ata-P((R)-3HB)-b-PCL.
Figure 8:
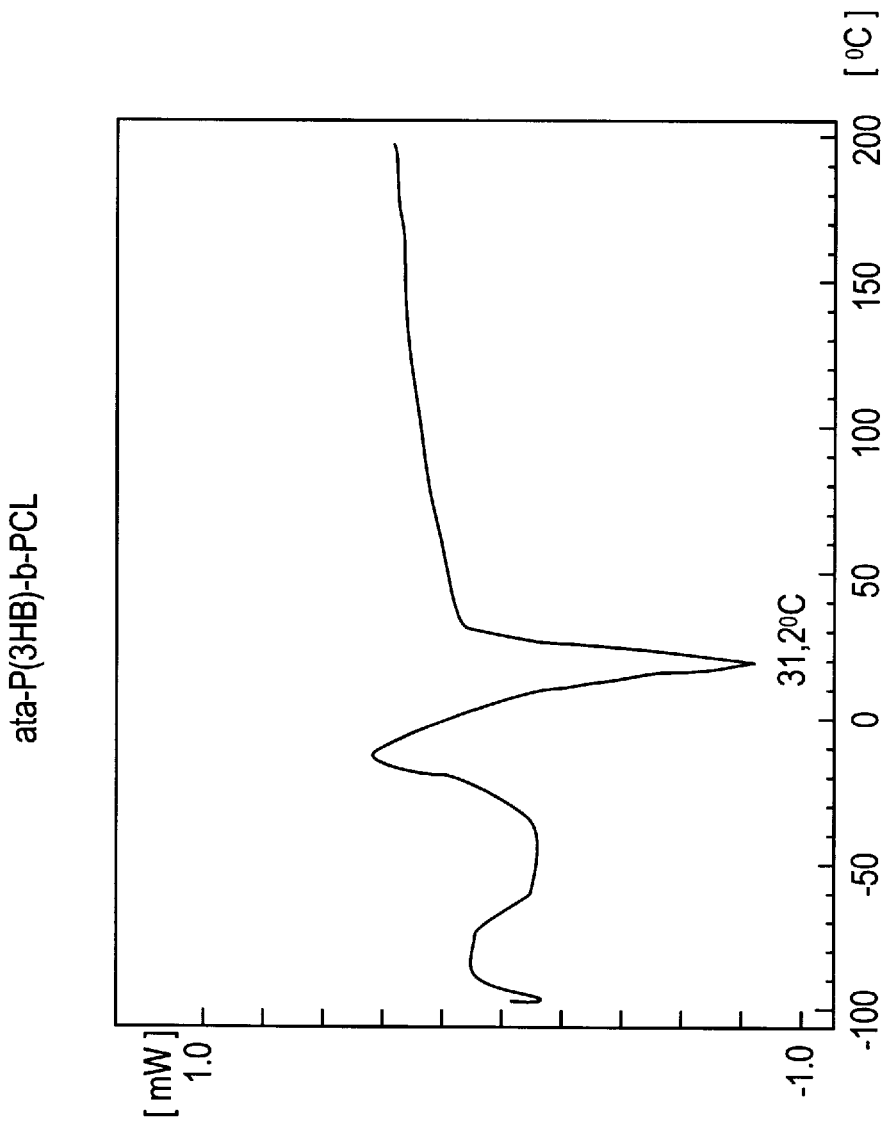
FIG. 8 is a DSC chart of ata-P((R)-3HB)-b-PCL.

FIGS. 5 and 8 respectively show a DSC chart and a $^{13}$C NMR spectrum of thus obtained product.

(A) Microbial polymer P[(R)-3HB] or P[(R)-3HB-co-5%(R)-3HV], (B)PCL, P(15-HPD) or PVL and (C) iso- or syndio-type block copolymer are mixed in a predetermined proportion as indicated in Table 2, dissolved in chloroform, cast into a film and dried for one week.

The film thus obtained is pelletised formed into a "dumbbell" shape by a projection molder (model CS-183 MMX mini max molder made by Custom Scientific Instruments Inc.), and, after 2 days, subjected to tensile strength tests.

In examples 1–14, utilised polymers (A) and (B) have the following molecular weight:

| P[(R)-3HB] | Mn = 245,000; Mw = 546,000 |
| P[(R)-3HB-co-5%(R)-3HV] | Mn = 368,000; Mw = 653,000 |
| PCL | Mn = 200,000; Mw = 350,000 |
| P(15-HPD) | Mn = 97,000; Mw = 167,000 |
| PVL | Mn = 73,000; Mw = 150,000 |

In examples 1–11, utilised block copolymers (C) have the following figures: iso or syn-P[(R)-3HB]-b-PCL: (R)-3HB:CL=32:68; Mn=281,000; Mw=712,000 isoP[(R)-3HB]-b-P(15-HPD): (R)-3HB:15-HPD=61:39: Mn=140,000; Mw=228,000

In example 12: iso-P[(R)-3HB]-b-PVL(isotacticity ≧96%):(R)-3HB:VL=32:68; Mn=64,000; Mw=115,000

In example 13: iso-P[(R)-3HB]-b-PVL(isotacticity= 84%): (R)-3HB:VL=32:68; Mn=85,000; Mw=138,000 iso-P[(R)-3HB] portion having 84% of isotacticity is obtained by mixing (R)-BL(≧96%) and racemic BL in the proportion of 87:13 and polymerising it at 100° C.

In example 14: Syn-P(3HB)-b-PVL (syndiotacticity= 64%, melting temperature 55° C.): (R)-3HB:VL=32:68; Mn=96,000;.Mw=163,000. Syn-P(3HB) portion having 64% of syndiotacticity is obtained by polymerising racemic BL at 70° C. In comparative examples 1–8, utilised polymers (A) and (B) and block copolymers (C) have the following figures:

| P[(R)-3HB] | Mn = 245,000; Mw = 546,000 |
| P[(R)-3HB-co-5%(R)-3HV] | Mn = 368,000; Mw = 653,000 |
| PCL | Mn = 200,000; Mw = 350,000 | ata-P(3HB)-b-PCL (atactic, melting temperature 31° C.): 3HB:CL=46:54; Mn=60000; Mw=96,000

In the above examples 1–14 and the comparative examples 1–8, 2 polymers (A) and (B) and a block copolymer (C) are mixed in a weight proportion indicated in Table 2 to give a total weight of 10.0 g.

Figure 2:
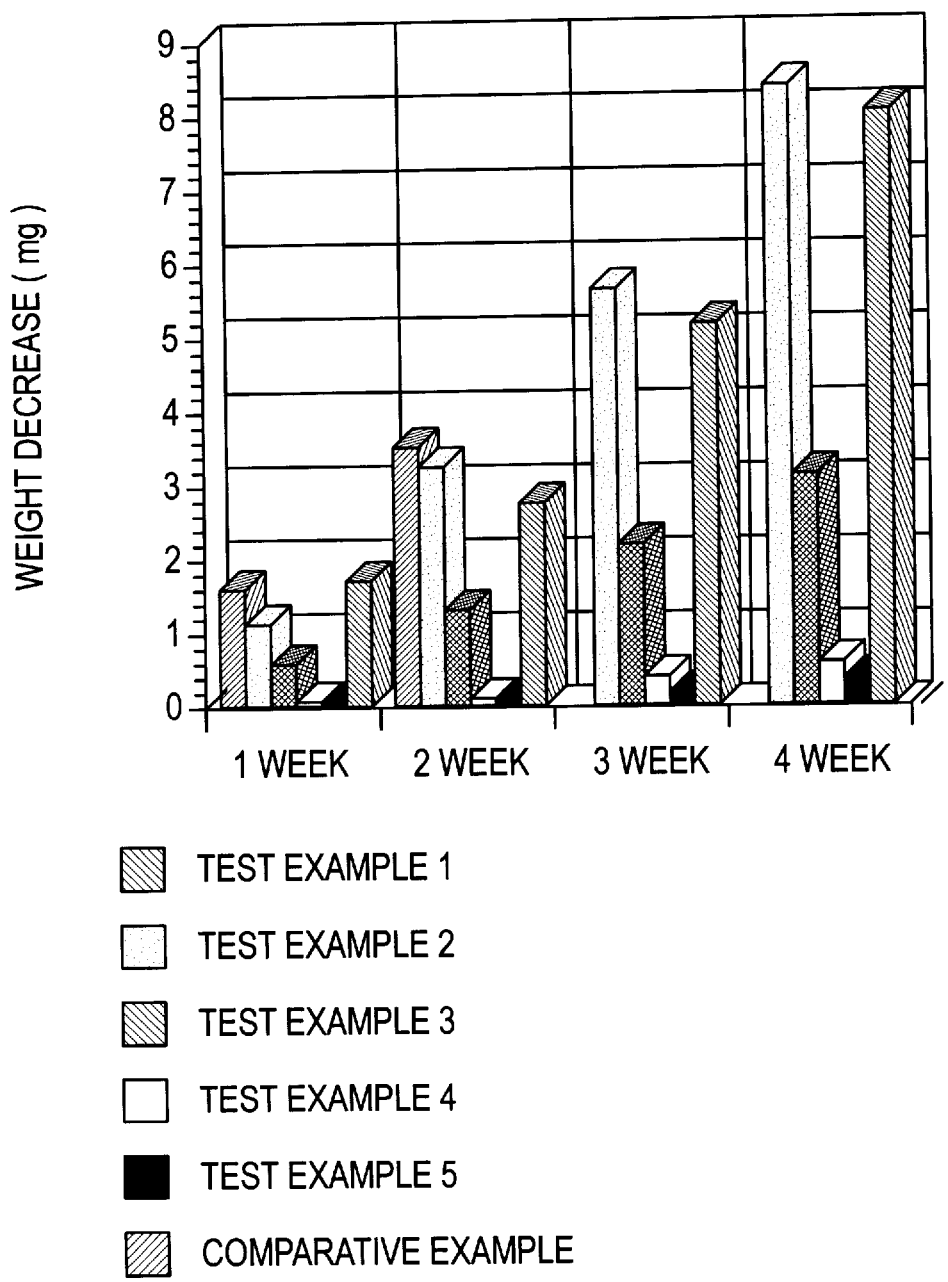
FIG. 2 shows the results of the biodegradation tests carried out on P [(R)-3HB]- non compatible polymer-block copolymer compositions.

II-b. FIG. 2 summarizes the results of biodegradability tests effected on some representative samples. In FIG. 2:

1.0 g of mixture of microbial P[(R)-3HB], PCL and block copolymer iso-P[(R)-3HB]-b-PCL was dissolved in chloroform, cast in a disk, formed into a film by distilling the chloroform and dried for one week. The film thus obtained is 1 cm×1 cm square and 0.03 to 0.05 mm thick. 7 to 10 mg of film is put into 50 ml of flask. 30 ml of activated sludge (500 ppm in 600 ml) is added in the flask and reacted at 25° C. at pH 6.0 to 7.0 under stirring in a thermostat water bath made by Tytech Ltd. Decrease in film weight is measured after 4 weeks of biodegradation.

In all test examples:

| Microbial P[(R)-3HB] | Mn = 245,000; Mw = 546,000 |
| PCL | Mn = 200,000; Mw = 400,000 |
| Iso-P[(R)-3HB]-b-PCL | proportion (R)-3HB to CL = 51:49; Mn = 172,000 Mw = 272,000. |

Test example 1: 0.71 g of microbial P[(R)-3HB], 0.24 g of PCL and 0.05 g of iso-P[(R)-3HB]-PCL were mixed (71:24:6). The mixture was dissolved in chloroform and further processed as described above. Weight decrease in the product film was 4.15 mg after 2 weeks and became unweighable after 3 weeks.

Test example 2: 0.60 g, 0.20 g and 0.20 g of each constituent were mixed (60:20:20). Weight decrease was 8.49 mg after 4 weeks.

Test example 3: 0.45 g, 0.45 g and 0.10 g of each constituent were mixed (45:45:10). Weight decrease was 3.27 mg after 4 weeks.

Test example 4: 0.25 g, 0.25 g and 0.50 g of each constituent were mixed (25:25:50). Weight decrease was 0.62 mg after 4 weeks.

Test example 5: 0.25 g, 0.70 g and 0.05 g of each constituent were mixed (25:70::5). Weight decrease was 0.41 mg after 4 weeks.

Comparative test example: 1.0 g of microbial P[(R)-3HB] was used alone. Weight decrease was 8.10 mg after 4 weeks.

TABLE 1

| | a) Block copolymer (monomeric molar ratio) | b) Weight proportion (P[(R)-3HB]/ Block copolymer) | c) Tensile strength (MPa) | d) Elongation (%) |
|---|---|---|---|---|
| Example 1 | iso-P[(R)-3HB]-b-PCL (51/49) | 90/10 | 57 | 146 |
| Example 2 | iso-P[(R)-3HB]-b-PCL (51/49) | 70/30 | 39 | 185 |
| Example 3 | iso-P[(R)-3HB]-b-PCL (51/49) | 50/50 | 38 | 480 |
| Example 4 | iso-P[(R)-3HB]-b-PCL (51/49) | 30/70 | 41 | 650 |
| Example 5 | iso-P[(R)-3HB]-b-PCL (51/49) | 10/90 | 35 | 720 |
| Example 6 | iso-P[(R)-3HB]-b-PCL (19/81) | 95/5 | 54 | 140 |
| Example 7 | iso-P[(R)-3HB]-b-PCL (19/81) | 70/30 | 38 | 490 |
| Example 8 | iso-P[(R)-3HB]-b-PCL (19/81) | 10/90 | 42 | 1504 |
| Example 9 | iso-P[(R)-3HB]-b-P(3HB) (50/50) | 70/30 | 34 | 132 |
| Example 10 | iso-P[(R)-3HB]-b-PVL (51/49) | 70/30 | 32 | 91 |
| Example 11 | iso-P[(R)-3HB]-b-PLA (54/46) | 70/30 | 30 | 50 |
| Example 12 | iso-P[(R)-3HB]-b-P((R)-MDO) (49/51) | 70/30 | 34 | 45 |
| Example 13 | iso-P[(R)-3HB]-b-P(15HPD) (61/39) | 70/30 | 36 | 110 |
| Example 14 | iso-P[(R)-3HB]-b-P(16H-9HD) (60/40) | 70/30 | 35 | 115 |
| Example 15 | iso-P[(R)-3HB]-b-PTMC (55/45) | 70/30 | 27 | 101 |
| Example 16 | iso-P[(R)-3HB]-b-PDTC (55/45) | 70/30 | 31 | 27 |
| Example 17 | iso-P[(R)-3HB]-b-PCL (19/81) | 70/30*[1] | 42 | 430 |
| Example 18 | iso-P[(R)-3HB]-b-PTMC (55/45) | 70/30*[2] | 31 | 51 |
| Comparative Example 1 | — | 100/0 | 40 | 5 |
| Comparative Example 2 | iso-P[(R)-3HB]-b-PCL (51/49) | 0/100 | 34 | 785 |
| Comparative Example 3 | iso-P[(R)-3HB]-b-PCL (19/81) | 0/100 | 41 | 1654 |

*[1] P[(R)-3HB-co-11% (R)-3HV] instead of iso-P[(R)-3HB]
*[2] P[(R)-3HB-co-10% TMC] instead of iso-P[(R)-3HB]

TABLE 2

| | a) Constituents (A), (B) & (C) | b) Weight proportion of (A), (B) & (C) | c) Tensile Strength (MPa) | d) Elongation % |
|---|---|---|---|---|
| Example 1 | P[(R)-3HB]:PCL:iso-P[(R)-2HB]-b-PCL | 80:15:5 | 31.0 | 16 |
| Example 2 | P[(R)-3HB]:PCL:syn-P(3HB)-b-PCL | 80:15:5 | 28.1 | 20 |
| Example 3 | P[(R)-3HB]:PCL:iso-P[(R)-3HB]-b-PCL | 70:25:5 | 33.5 | 15 |
| Example 4 | P[(R)-3HB]:PCL:syn-P(3HB)-b-PCL | 70:25:5 | 31.7 | 26 |
| Example 5 | P[(R)-3HB]:PCL:iso-P[(R)-3HB]-b-PCL | 45:45:10 | 35.5 | 855 |
| Example 6 | P[(R)-3HB]:PCL:syn-P(3HB)-b-PCL | 45:45:10 | 28.3 | 603 |
| Example 7 | P[(R)-3HB]:PCL:iso-P[(R)-3HB]-b-PCL | 25:25:50 | 24.2 | 792 |
| Example 8 | P[(R)-3HB]:PCL:syn-P(3HB)-b-PCL | 25:25:50 | 20.7 | 1033 |
| Example 9 | P[(R)-3HB-co-5% (R)-3HV]:PCL:iso-P[(R)-3HB]-b-PCL | 70:25:5 | 33.1 | 29 |
| Example 10 | P[(R)-3HB-co-5% (R)-3HV]:PCL:syn-P(3HB)-b-PCL | 70:25:5 | 31.5 | 33 |
| Example 11 | P[(R)-3HB]:P(15-HPD):iso-P[(R)-3HB]-b-P(15-HPD) | 70:25:5 | 29.1 | 10 |

TABLE 2-continued

| | a) Constituents (A), (B) & (C) | b) Weight proportion of (A), (B) & (C) | c) Tensile Strength (MPa) | d) Elongation % |
|---|---|---|---|---|
| Example 12 | P[(R)-3HB]:PVL:iso-P[(R)-3HB]-b-PVL | 70:25:5 | 31.8 | 22 |
| Example 13 | P[(R)-3HB]:PVL:80%-iso-P[(R)-3HB]-b-PVL | 70:25:5 | 31.2 | 24 |
| Example 14 | P[(R)-3HB]:PVL:64%-syn-P(3HB)-b-PVL | 70:25:5 | 29.9 | 30 |
| Comparative Example 1 | P[(R)-3HB] | 100:0:0 | 27.6 | 8 |
| Comparative Example 2 | P[(R)-3HB-co-5%(R)-3HV] | 100:0:0 | 29.2 | 9 |
| Comparative Example 3 | P[(R)-3HB]:PCL | 75:25 | 33.5 | 10 |
| Comparative Example 4 | P[(R)-3HB]:PCL | 50:50 | 21.2 | 13 |
| Comparative Example 5 | P[(R)-3HB]:PCL:ata-P(3HB)-b-PCL | 70:25:5 | 23.1 | 10 |
| Comparative Example 6 | P[(R)-3HB]:PCL:ata-P(3HB)-b-PCL | 45:45:10 | 25.4 | 44 |
| Comparative Example 7 | P[(R)-3HB]:PCL:ata-P(3HB)-b-PCL | 25:25:50 | 5.4 | 195 |
| Comparative Example 8 | P[(R)-3HB-co-5%(R)-3HV]:PCL:ata-P(3HB)-PCL | 70:25:5 | 30.7 | 24 |

What is claimed is:

1. Biodegradable composition comprising at least either poly(beta-hydroxybutyric acid) or a biodegradable copolymer thereof and a di-block copolymer or tri-block copolymer of poly(beta-hydroxybutyric acid) with other biodegradable polyesters or biodegradable polycarbonates, with the poly(beta-hydroxybutyric acid) unit in said block copolymer having a stereospecifically regular structure, wherein said biodegradable polyesters or said biodegradable polycarbonates have a polymerization degree of from 300 to 5,000.

2. Biodegradable composition according to claim 1, wherein said block copolymer with biodegradable polyesters is poly(beta-hydroxybutyric acid)-polycaprolactone.

3. Biodegradable composition according to claim 1, wherein said block copolymer with biodegradable polycarbonates has the structure units of formula (II)

where $R^2$, $R^3$, $R^4$ and $R^5$ are either a hydrogen atom or a methyl group; and m and n are respectively an integer ranging from 300 to 5,000.

4. Biodegradable composition according to claim 3, wherein said block copolymer with biodegradable polycarbonates is poly(beta-hydroxybutyric acid)-poly(trimethylene carbonate).

5. Biodegradable composition according to claim 1, wherein weight proportion of poly(beta-hydroxybutyric acid) or a biodegradable copolymer thereof is above 50% in the total composition.

6. Biodegradable composition according to claim 1, wherein said composition further comprises a biodegradable polymer non-compatible with the poly(beta-hydroxybutyric acid) or with a biodegradable copolymer thereof, and wherein said non-compatible biodegradable polymer is a polymer of a lactone of formula (V)

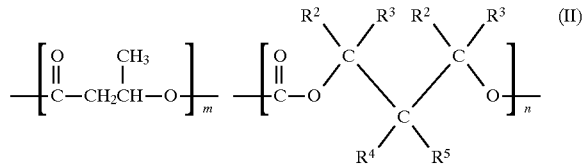

wherein $R^6$ is an alkylene group having 2 to 14 carbon atoms or an alkylene group having 2 to 14 carbon atoms containing an ester group or an ether group.

7. Biodegradable composition according to claim 6 wherein said non-compatible polymer and the biodegradable polyester unit in the block copolymer is a polymer of ε-caprolactone.

8. Biodegradable composition according to claim 6, wherein weight proportion of the poly(beta-hydroxybutyric acid) or a biodegradable copolymer thereof is above 50% in the total composition.

9. Biodegradable composition according to claim 1, wherein weight proportion of the block copolymer is not above 10% of the total composition.

10. Process for preparing the biodegradable composition comprising at least either poly(beta-hydroxybutyric acid) or the biodegradable copolymer thereof and a block copolymer of poly(beta-hydroxybutyric acid) with other polyesters or polycarbonates in which poly(beta-hydroxybutyric acid) unit has a stereospecifically regular structure, the process comprising the steps of:

a) reacting (R)-β-butyrolactone, (S)-β-butyrolactone or β-butyrolactone in the presence of a catalyst under inert conditions, thereby obtaining poly(beta-hydroxybutyric acid);

b) adding an inert diluting solvent thereto;

c) reacting another lactone or cyclic carbonate therewith, thereby obtaining a block copolymer of poly(beta-hydroxybutyric acid)-polyester or -polycarbonate (AB type block copolymer) In appropriate monomeric molar ratio;

d) reacting, where appropriate, further (R)-β-, (S)-β-, β-butyrolactone or another lactone or cyclic carbonate therewith, thereby obtaining ABA type or ABC type block copolymer; and e) mixing thus obtained block copolymer with poly(beta-hydroxybutyric acid) or a biodegradable copolymer thereof in appropriate proportion.

11. Process according to claim 10, wherein the catalyst is a distannoxane of the formula (III):

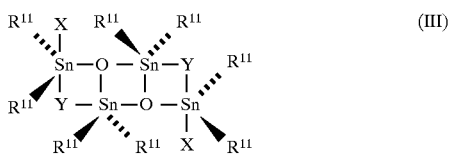

where $R^{11}$ indicates an alkyl group having 1 to 12 carbon atoms, an aralkyl group having 12 carbon atoms at maximum or a phenyl group; X is selected from the group consisting of Cl, Br and NCS; and Y is selected from the group consisting of Cl, Br, NCS, OH, an alkoxy group having 1 to 4 carbon atoms and a phenoxy group.

12. Biodegradable composition according to claim 6, wherein said biodegradable polyester or polycarbonate unit in the block copolymer is a polymer of a lactone of formula (V):

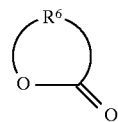

wherein $R^6$ is an alkylene group having 2 to 14 carbon atoms or an alkylene group having 2 to 14 carbon atoms containing an ester group or an ether group.

13. Biodegradable composition according to claim 1, wherein said block copolymer with other biodegradable polyesters has the structure units of formula (I):

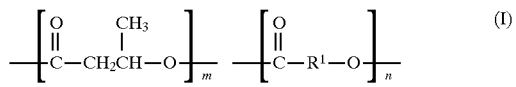

where $R^1$ is an alkylene group having 2 to 14 carbon atoms or an alkylene group having 2 to 14 carbon atoms containing an ester group or an ether group; and m and n are respectively an integer ranging from 300 to 5,000.

14. Plasticizing compound comprised of a block copolymer of stereospecifically regular poly(beta-hydroxybutyric acid) with a biodegradable polyester, having the structure units of formula (I):

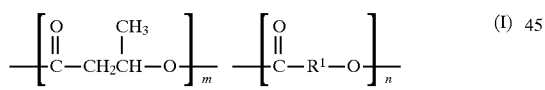

where $R^1$ is an alkylene group having 2 to 14 carbon atoms or an alkylene group having 2 to 14 carbon atoms containing an ester group or an ether group; and m and n are respectively an integer ranging from 300 to 5,000, or with a polycarbonate, having, the structure units of formula (II):

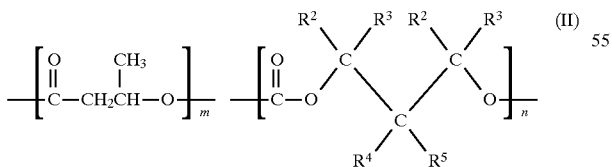

where $R^2$, $R^3$, $R^4$ and $R^5$ are either a hydrogen atom or a methyl group; and m and n are respectively an integer ranging from 300 to 5,000.

15. Compatibilizing compound comprised of a block copolymer of stereospecifically regular poly(beta-hydroxybutyric acid) with a biodegradable polyester, having the structure units of formula (I):

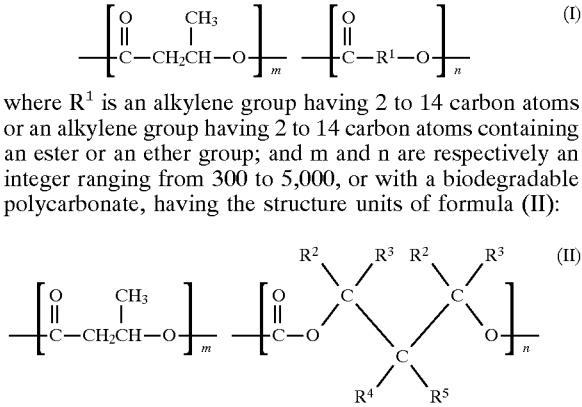

where $R^1$ is an alkylene group having 2 to 14 carbon atoms or an alkylene group having 2 to 14 carbon atoms containing an ester or an ether group; and m and n are respectively an integer ranging from 300 to 5,000, or with a biodegradable polycarbonate, having the structure units of formula (II):

where $R^2$, $R^3$, $R^4$ and $R^5$ are either a hydrogen atom or a methyl group; and m and n are respectively an integer ranging from 300 to 5,000.

16. Biodegradable composition according to claim 1, wherein said composition is catalytically produced with a distannoxane of formula (III):

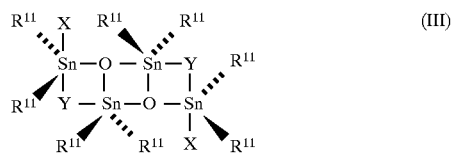

where $R^{11}$ indicates an alkyl group having 1 to 12 carbon atoms, an aralkyl group having 12 carbon atoms at maximum or a phenyl group; X is selected from the group consisting of Cl, Br and NCS; and Y is selected from the group consisting of Cl, Br, NCS, OH, an alkoxy group having 1 to 4 carbon atoms and a phenoxy group.

17. Plasticizing compound according to claim 14, wherein said composition is catalytically produced with a distannoxane of formula (III):

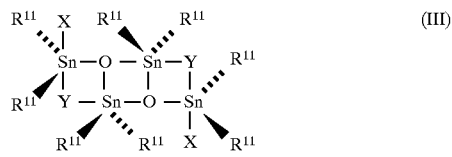

where $R^{11}$ indicates an alkyl group having 1 to 12 carbon atoms, an aralkyl group having 12 carbon atoms at maximum or a phenyl group; X is selected from the group consisting of Cl, Br and NCS; and Y is selected from the group consisting of Cl, Br, NCS, OH, an alkoxy group having 1 to 4 carbon atoms and a phenoxy group.

18. Compatibilizing compound according to claim 15, wherein said composition is catalytically produced with a distannoxane of formula (III):

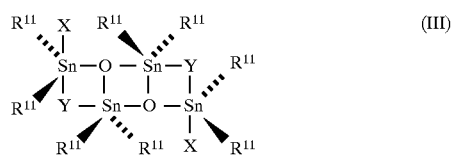

where $R^{11}$ indicates an alkyl group having 1 to 12 carbon atoms, an aralkyl group having 12 carbon atoms at maximum or a phenyl group; X is selected from the group consisting of Cl, Br and NCS; and Y is selected from the group consisting of Cl, Br, NCS, OH, an alkoxy group having 1 to 4 carbon atoms and a phenoxy group.

19. Biodegradable composition comprising a biodegradable copolymer of poly(R)-beta-hydroxybutyric acid-(R)-3-hydroxyvaleric acid) and a di-block copolymer or tri-block copolymer of poly(beta-hydroxybutyric acid) with other biodegradable polyesters or biodegradable polycarbonates, with the poly(beta-hydroxybutyric acid) unit in said block copolymer having a stereospecifically regular structure, wherein said biodegradable polyesters or said biodegradable polycarbonates have a polymerization degree of from 300 to 5,000.

* * * * *